Sept. 29, 1959

J. L. BOWER 2,906,179

VECTOR GAGE

Filed Jan. 28, 1957

INVENTOR.
JOHN L. BOWER

BY

ATTORNEY

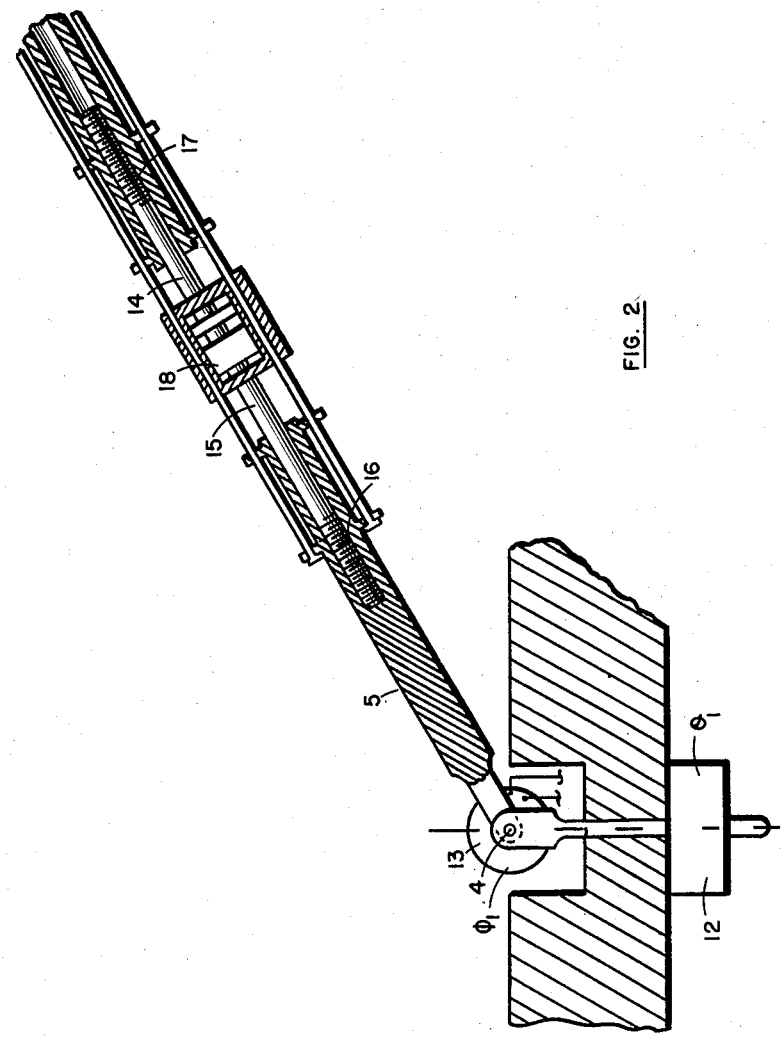

Sept. 29, 1959       J. L. BOWER        2,906,179
                     VECTOR GAGE Filed Jan. 28, 1957                7 Sheets-Sheet 3

INVENTOR.
JOHN L. BOWER

BY *Frederic B. Schramm*

ATTORNEY

Sept. 29, 1959     J. L. BOWER     2,906,179
VECTOR GAGE

Filed Jan. 28, 1957     7 Sheets-Sheet 5

INVENTOR.
JOHN L. BOWER
BY
ATTORNEY

Sept. 29, 1959  J. L. BOWER  2,906,179
VECTOR GAGE

Filed Jan. 28, 1957                    7 Sheets-Sheet 6

INVENTOR.
JOHN L. BOWER

BY
ATTORNEY

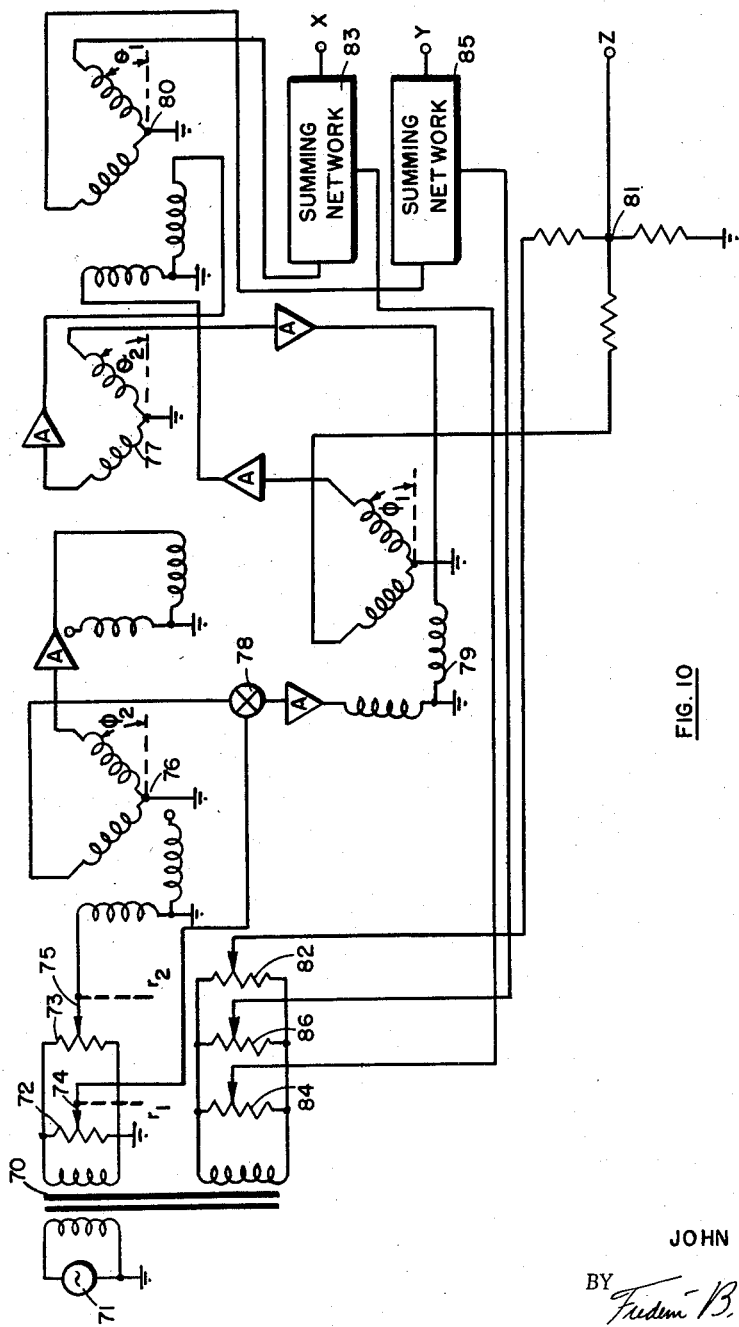

United States Patent Office 2,906,179
Patented Sept. 29, 1959

2,906,179

VECTOR GAGE

John L. Bower, Downey, Calif., assignor to
North American Aviation, Inc.

Application January 28, 1957, Serial No. 636,535

10 Claims. (Cl. 90—13.5)

This invention relates to vector gages and particularly to a gage adapted to indicate the position of a point relative to a preselected reference point.

It is frequently desirable in machine tool operations to determine the position of a point accurately on a workpiece relative to some preselected reference point on the machine tool. Since the point, whose position is to be determined, is often located in a position which is not readily accessible from the reference point by ordinary measuring devices, it is desirable to produce a flexible relative position indicator. A device, which measures the coordinates of a point on a probe which, in turn, can be placed against the point on the workpiece with great flexibility, has numerous uses in machine tool operation. Thus for inspection of a part having complex surfaces, it is convenient to be able to touch any point on the surface of the part with a probe and obtain an immediate numerical indication of its coordinates relative to some fixed reference point. A gage of this type can also be used to indicate the instantaneous position of the cutting edge of a machine tool. By appropriate circuitry it can be used to compare this position with a programmed machining schedule. Appropriately positioned servo motors can then be actuated in response to the positioning error in a manner to position the tools accurately. The origin or point of reference might be any point, either on or off the workpiece.

It is therefore an object of this invention to provide a flexible vector gage useful for accurately indicating the vector position of a point relative to a reference point.

It is another object of this invention to provide an improved vector gage for continuously indicating the relative positions of two points utilizing a continuous flexible linkage system interconnecting the two points, means for generating signals proportional to a vector representation of each link in the linkage system and a computer adapted to resolve the individual vectors of the links into signals proportional to the vector representation of a line joining the two points.

It is a further object of this invention to provide a vector gage for indicating the relative position of two points comprising a continuous flexible linkage system joining said two points; means for indicating the vector representation of each link of said linkage system relative to the next preceding link; means for indicating the vector representation of the first link in said linkage system relative to a preselected coordinate system; and means for resolving said vector representations of said first-named vector indicating means into indications of the vector representations relative to said preselected coordinate system and vectorially summing all of said indications of said vectors.

It is another object of this invention to provide an improved gage for measuring the relative positions of two points comprising a flexible linkage system connecting said two points, means for generating signals proportional to the angular bearings and lengths of the individual links in said system, and computer means responsive to said signal generating means for resolving said angular bearings and lengths of said individual links into outputs proportional to the vector position of one of said points relative to the other.

It is another object of this invention to provide an improved vector gage for measuring the position of a point relative to a reference point, utilizing a plurality of links pivotally connected in series; means for pivotally supporting the free end of the link at one end of said series linkage system at said reference point, angle measuring means positioned to measure the bearing of said link connected to said reference point relative to a plurality of reference coordinate axes intersecting at said reference point, angle measuring means producing a signal output proportional to the bearings of successive links in said series linkage system relative to each other; and means responsive to the signal outputs of said bearing measuring means for resolving the lengths of each of said series of links in a manner to produce a vector indication relative to said reference point of the free end of the other end link of said linkage system.

Other objects of invention will become apparent from the following description taken in connection with the accompanying drawings, in which:

Fig. 2 is a section view of the first link of the vector gage of Fig. 1 showing a typical pivotal support for one end of a link at a reference point;

Fig. 10 is a schematic drawing of a typical computer utilized to convert the angle and distance measurements of the vector gage of Fig. 1 into three orthogonal coordinates;

Figure 11:
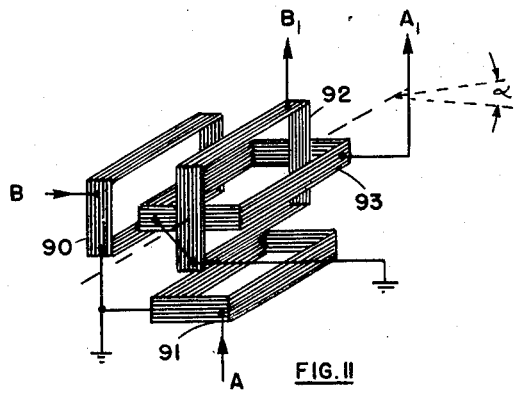

And Fig. 11 is a schematic drawing of a typical resolver utilized in the computer of Fig. 10.

Figure 1:
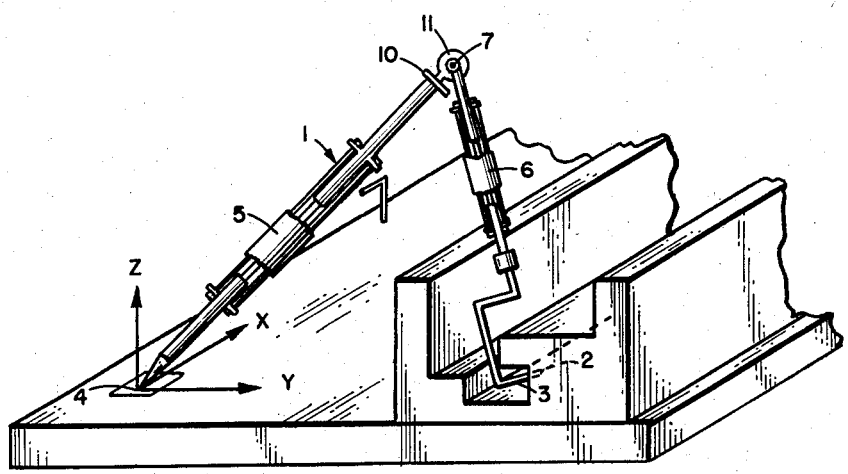
Fig. 1 is a perspective view of a preferred embodiment of the flexible vector gage contemplated by this invention.
Figure 3:
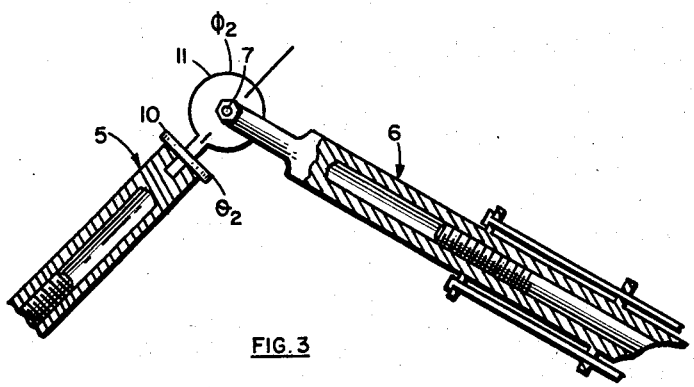
Fig. 3 is a section view of the pivotal connection between the two links of the vector gage of Fig. 1.

Referring now to Fig. 1, a vector gage 1 is utilized to determine the relative position of end point 2 of probe 3 relative to reference point 4. Vector gage 1 consists of two links 5 and 6, pivotally coupled together at common terminal 7. One end of link 5 is pivotally supported at reference point 4. Probe 3 is attached to the free end of link 6. It is desired instantaneously and accurately to convert a vector running from point 4 to point 2 into distances along orthogonal X, Y and Z coordinate axes which intersect at the point 4. As is readily apparent from the configuration of Fig. 1, a direct measurement by conventional means of the X, Y and Z components of point 2 is not easily accomplished. By utilizing a highly flexible linkage system illustrated in Fig. 5, it is possible to resolve the desired vector into two or more component vectors, the coordinates of which are readily obtainable. Consider the axis of link 5 as the line joining point 4 and point 7, while the axis of line 6 is the line joining point 7 and point 2. The axis of link 5 intersects the vertical and horizontal pivot axes of the link 5 at the point 4, Likewise the effective axis of the link 6 is a line 2—7, which intersects the axis of the link 5 and the axes transverse to the link 5 and longitudinal thereto, with respect to which the link 6 is pivoted to the link 5 at the point 7. To achieve pivoting of the link 6 around the link 5, the latter may be rotatably mounted in a socket 9. The axes of links 5 and 6 form vectors, the resultant of which is a vector from point 4 to point 2. Appropriately positioned resolvers can readily produce an accurate indication of the bearing of the axis of link 5 relative to the X, Y and Z coordinate axes. A second set of resolvers positioned near common terminal 7 of the links 5 and 6 can also produce an accurate indication of the bearing of the axis of link 6 relative to a set of coordinates having a fixed positional relationship with respect to the axis of link 5. For additional flexibility, the lengths of links 5 and 6 may be made adjustable as illustrated in Figs. 2 and 3.

Figure 4:
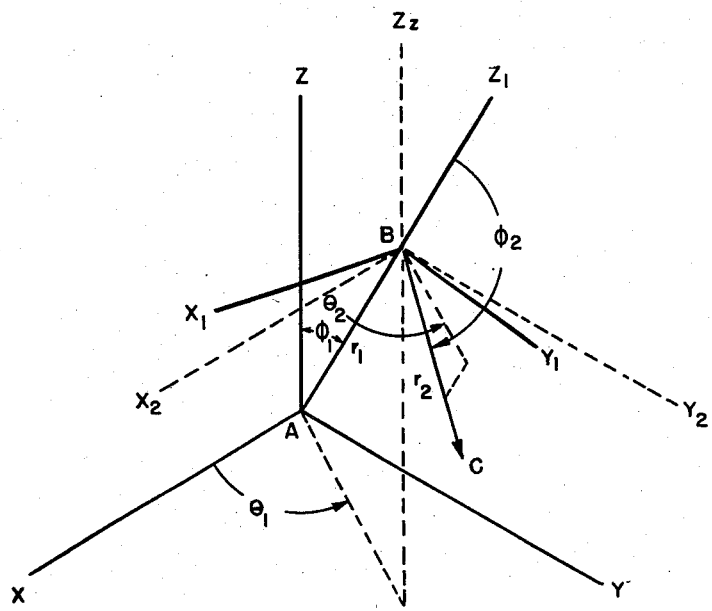
Fig. 4 is a vector diagram of the linkage system of Fig. 1 showing the angles and distances measured by the preferred embodiment of this invention.

Referring now to Fig. 4, a vector indication of the two vectors utilized in the preferred embodiment of this invention as component parts of the desired vector is shown. In the representation of Fig. 4, point A is synonymous with point 4, point B is synonymous with point 7, and point C is synonymous with point 2 of Fig. 1. The length of the vector from point A to point B is $r_1$. The length of the vector from point B to point C is $r_2$. The angular bearing of any vector relative to the three coordinate axes can be fixed in space by the measurement of two angles. Thus, the bearing of the vector AB is fixed relative to the X, Y, Z coordinate axes by angles $\phi_1$ and $\theta$, where $\phi_1$ represents the declination of the link 5 or the angle between the Z axis and the vector AB and $\theta_1$ represents the azimuth of the link 5 or the angle between its projection on the plane XY and X axis.

A second set of reference axes having a fixed positional relationship to the vector AB are shown as orthogonal axes $X_1$, $Y_1$, and $Z_1$ which intersect at the point 7. For simplicity the axis $Z_1$ is defined as an extension of the vector AB, axis $X_1$ is selected normal to the $Z_1$ axis and in the plane formed by the vector AB and the Z axis, and the axis $Y_1$ is normal to both axes $Y_1$ and $Z_1$.

The bearing of the vector BC relative to the $X_1$, $Y_1$ and $Z_1$ axes is determined by the angles $\phi_2$ and $\theta_2$ where $\phi_2$ is the angle between the axis $Z_1$ and the vector BC and $\theta_2$ is the angle between the $X_1$ axis and the projection of the vector BC on the plane of the axes $X_1$ and $Y_1$.

Figure 5:
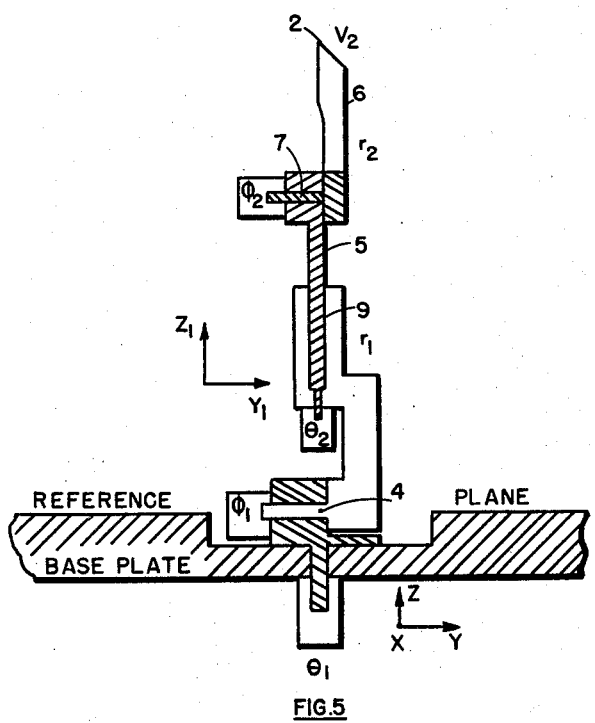
Fig. 5 is a sectional view of an illustrative construction for mounting gage links with a suitable pivot arrangement.

Referring to Fig. 5 the $Y_1$ axis extends through the intersection of the axis of the $\phi_2$ hinge and links 5 and 6 and is parallel to the axis of the $\phi_1$ hinge.

It will be observed that the hinge axes of the angles $\theta_1$, $\phi_1$ and $\theta_2$ intersect in the reference plane XY at the origin of the XYZ coordinate system. The axis of the $\theta_2$ hinge intersects that of the $\phi_1$ hinge and is normal to it. The $\phi_1$ axis lies in the reference plane, normal to the $\theta_1$ axis.

It is desired to resolve the sum of the vector AB and the vector BC into distances measured along the X, Y and Z axes. In order to accomplish this resolution, it is necessary to combine in a predeterminable fundamental relationship the instantaneous values of the angles $\phi_1$, $\theta_1$, and $\theta_2$ and distances $r_1$ and $r_2$.

The vector addition is facilitated by assuming a transposition of axes. Referring to Fig. 4, axes $X_2$, $Y_2$ and $Z_2$ are shown having an origin at point B respectively parallel to the axes X, Y and Z. Both sets of axes are mutually orthogonal axes. Let the coordinates of the point B with respect to the axes X, Y and Z, be $\Delta x$, $\Delta y$, and $\Delta z$, respectively, and the coordinates of the point C with respect to the axes $X_2$, $Y_2$ and $Z_2$ be $\Delta x_2$, $\Delta y_2$ and $\Delta z_2$, respectively. Then with respect to the axes X, Y and Z, the coordinates of the point C are respectively $$X = \Delta x + \Delta x_2$$
$$Y = \Delta y + \Delta y_2$$
$$Z = \Delta z + \Delta z_2$$

The coordinates of the point B in terms of the distance, $r_1$, of the point B from the point A and angles $\phi_1$ and $\theta_1$ are $$x = r_1 \sin \phi_1 \cos \theta_1$$
$$y = r_1 \sin \phi_1 \sin \theta_1$$
$$z = r_1 \cos \phi_1$$

The coordinates of the point C in terms of distances $r_1$ and $r_2$ and angles $\phi_1$, $\phi_2$, $\theta_1$ and $\theta_2$ are more complex but are obtainable by utilizing a transformation of coordinates in three dimensions.

The coordinates of the point C in relation to the $X_1$, $Y_1$, $Z_1$ axes and in terms of the distance $r_2$ of the point C from the point B, and angles $\phi_2$ and $\theta_2$ are $$x_1 = r_2 \sin \phi_2 \cos \theta_2$$
$$y_1 = r_2 \sin \phi_2 \sin \theta_2$$
$$z_1 = r_2 \cos \phi_2$$

These values are translated to the X, Y, Z axes and added to the values of the coordinates of the point B in terms of $r_1$, $\phi_1$ and $\theta_1$.

Employing the methods of trigonometry the following formulae for the coordinates of the point C are obtained $x = r_1 \sin \phi_1 \sin \theta_1 + r_2 (\cos \phi_1 \sin \theta_1 \sin \phi_2 \cos \theta_2 - \cos \theta_1 \sin \phi_2 \sin \theta_2 + \sin \phi_1 \sin \theta_1 \cos \phi_2)$ $y = r_1 \sin \phi_1 \cos \theta_1 + r_2 (\cos \phi_1 \cos \theta_1 \sin \phi_2 \cos \theta_2 - \sin \theta_1 \sin \phi_2 \sin \theta_2 + \sin \phi_1 \cos \theta_1 \cos \phi_2)$ $z = r_1 \cos \phi_1 + r_2 (\cos \phi_1 \cos \phi_2 - \sin \phi_1 \sin \phi_2 \cos \theta_2)$ From the foregoing, it is readily apparent that the X, Y and Z coordinates of point 2 can be obtained utilizing predetermined functions of distances $r_1$ and $r_2$ and angles $\phi_1$, $\theta_1$, $\phi_2$ and $\theta_2$. Therefore, by producing signal outputs which are proportional to the distances and angles and coupling these signals into a properly designed computer, an output indication of the X, Y and Z coordinates of point 2 is continuously obtained.

Referring now to Figs. 1, 2 and 3, a typical flexible linkage system for the vector gage contemplated by this invention is shown. In linkage system 1, lever arms 5 and 6 have adjustable lengths corresponding to distances $r_1$ and $r_2$, respectively. Links 5 and 6 are pivotally connected together at point 7. Resolvers 10 and 11 produce signal outputs which are proportional to trigonometric functions of $\theta_2$ and $\phi_2$, respectively. The lower end of link 5 is pivotally supported at fixed reference point 4, by a suitable mounting such as shown more clearly in Fig. 5. Resolvers 12 and 13 continuously produce signal outputs which are proportional to trigonometric functions of angles $\theta_1$ and $\phi_1$, respectively. Resolvers of a suitable type are provided also for producing signal outputs proportional to the lengths $r_1$ and $r_2$ of links 5 and 6. Such link lengths may be measured very precisely without the aid of screws by employing digital computer gage elements of the magnetic grid-counting type described in the copending application of John L. Bower and Wilton R. Abbott, Serial No. 519,602, filed July 1, 1955 or the optical grid counting type described in the copending application of John L. Bower and Wilton R. Abbott, Serial No. 520,086, filed July 5, 1955.

In Figs. 1, 2 and 3, for simplicity in the drawing, the links or arms 5 and 6 are illustrated as being extensible with schematically represented length resolvers. As shown in Fig. 2, the link 5 includes longitudinally separable shafts 14 and 15 secured in the ends of the link 5 in any suitable manner as by threads 16 and 17. An indicator or resolver 18 for indicating change in length of link 5 is represented schematically. The counter or indicator 18 produces a signal output proportional to length $r_1$. Link 6 is provided with a similar means for measuring its length.

Figure 6:
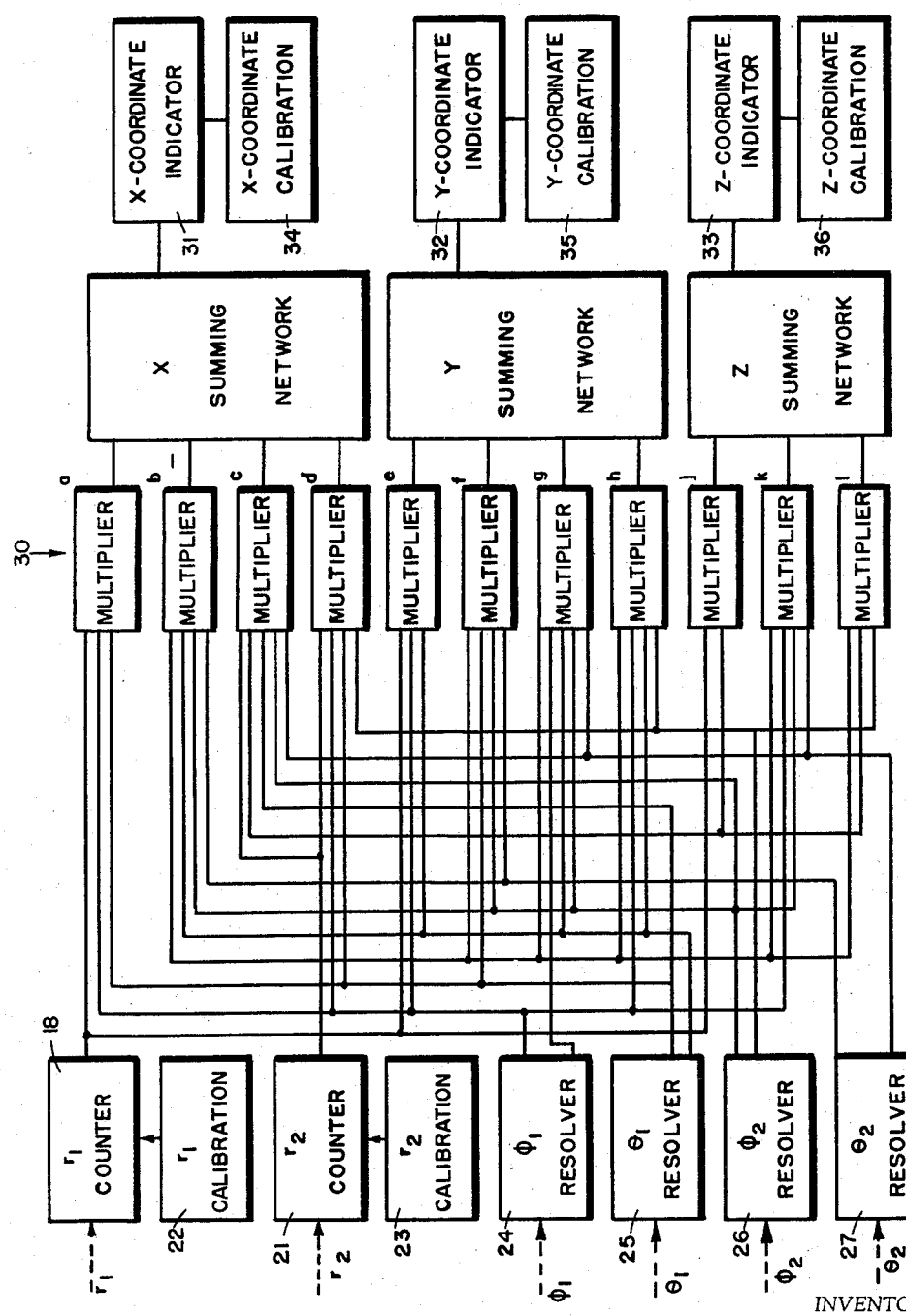
Fig. 6 is a block diagram of an electronic circuit utilized with the vector gage of Fig. 1.

Referring now to Fig. 6, there is shown in block diagram of an electronic circuit utilized to convert the length and angle measurements of the system of Fig. 1 into a coordinate indication of the vector sum of the link vectors. The indicator 18 produces a signal output which is proportional to length $r_1$ from point 4 to point 7 in Fig. 1. Indicator 21 is sensitive to changes in length of link 6 and produces an output signal which is proportional to length $r_2$ from point 7 to point 2. If length indicators of the grid-counting type are employed digital output signals will be obtained. The outputs of counters 18 and 21 may be reset by utilizing independent sources of calibration 22 and 23.

The movement of link 5 from a position of coincidence with the Z axis actuates $\phi_1$ resolver 24, which produces signal outputs proportional to the sine and cosine of angle $\phi_1$. The movement of link 5 about the Z axis actuates $\theta_1$ resolver 25 to produce signal outputs proportional to the sine and cosin of angle $\theta_1$. Angle $\theta_1$ is the angle between the projection of the axis of link 5 on the X—Y plane and the Y axis. The movement of link 6 from coincidence with an extension of link 5 actuates $\phi_2$ resolver 26 to produce signal outputs proportional to the sine and cosine of $\phi_2$. The movement of link 6 from coincidence with the plane defined by the Z axis and link 5 actuates $\theta_2$ resolver 27 to produce signal outputs proportional to the sine and cosine of angle $\theta_2$. The signal outputs from counters 18 and 21 and resolvers 24—27 are coupled into computer 30 where they are combined by conventional multiplying and summing networks in compliance with the equations previously given to produce output signals proportional to the X, Y and Z coordinates of point 2. X-coordinate indicator 31, Y-coordinate indicator 32 and Z-coordinate indicator 33 convert these signal outputs into a visual indication, preferably in numerical form, of the $x$, $y$ and $z$ coordinates. For purposes to be described later, calibration circuits 34, 35 and 36 are provided to change by predetermined amounts the readings of indicators 31, 32 and 33, respectively.

Figure 7:
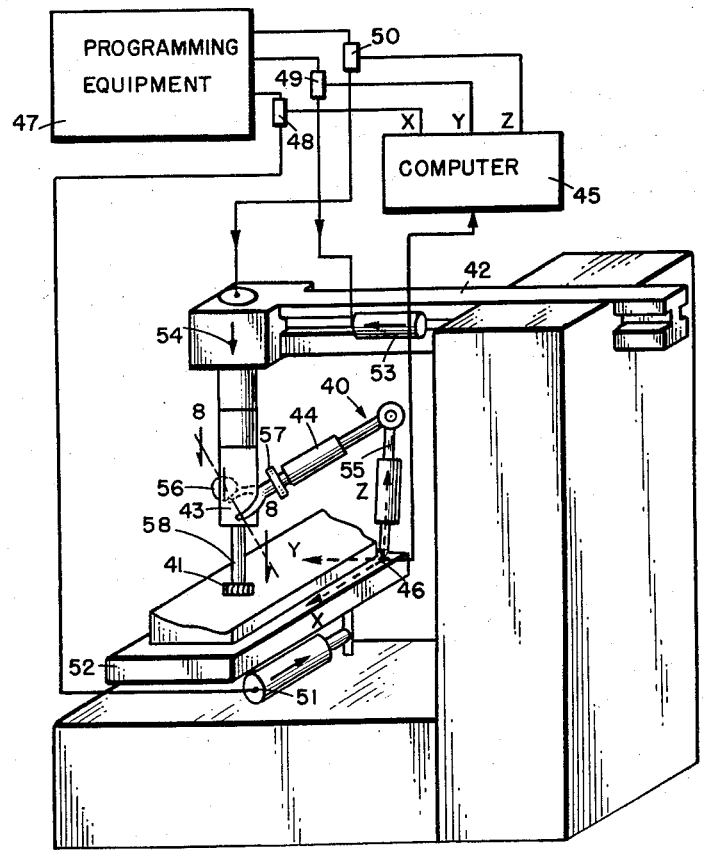
Fig. 7 is a perspective view of an alternative use for the vector gage contemplated by this invention.
Figure 8:
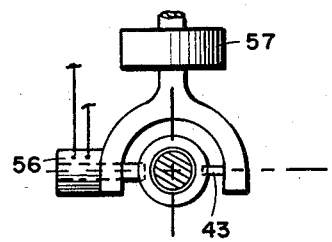
Fig. 8 is a section view of the flexible connection of the vector gage to the machine tool taken along the line 8—8 of Fig. 7.

Referring now to Figs. 7 and 8, an alternate use for the vector gage contemplated by this invention is shown. In this embodiment, a vector gage 40 is utilized to determine continuously the exact position of cutting edge 41 of machine tool 42. It is to be noted that vector gage 40 is connected to measure the position of point 43 which is a predetermined distance above and to the right of cutting edge 41 in Fig. 7. Thus, the free end of adjustable link 44 of vector gage 40 is pivotally connected to machine tool 42 at point 43. The signal outputs of the angle and distance measuring devices of vector gage 40 are coupled into computer 45. Computer 45 produces signal outputs which are proportional to the X, Y and Z coordinates of point 43 relative to point 46. To compensate for the off-set position of point 43 relative to cutting edge 41, X, Y, and Z calibration units similar to those described in connection with Fig. 6, are incorporated into computer 45. These units change the outputs of the multiplying and summing channels by predetermined amounts proportional to the magnitude of off-set in the Y and Z directions of point 43 relative to cutting edge 41. The actual output signals of computer 45 are, therefore, accurate indications of the X, Y and Z coordinates of cutting edge 41.

Machine tool programming equipment 47 produces signal outputs which are proportional to a desired position, $X_0$, $Y_0$ and $Z_0$, of cutting edge 41. The signal outputs are varied in a programmed manner to indicate a desired movement of cutting edge 41. These signal outputs are coupled into comparison networks 48, 49 and 50 where they are compared with the instantaneous signal outputs from computer 45. Comparator 48 produces an output voltage which is proportional to the deviation of the instantaneous position of cutting edge 41 in the X direction from coincident with the desired position indicated by the output of programming equipment 47. This signal output is connected to motor 51 which drives bed 52 along the X axis in a direction and magnitude sufficient to reduce the $x$ error to zero. Similarly, the output signal from comparator 49 actuates motor 53 to drive the cutting tool along the Y axis in a direction and magnitude sufficient to reduce the $y$ error signal to zero. The output signal from comparator 50 actuates motor 54 to drive the cutting tool along the Z axis in a direction and magnitude sufficient to reduce the $z$ error signal to zero.

In order to take into consideration any failure of the shaft of the cutting tool 41 to move with perfect perpendicularity or to travel linearly in the head of the machine 42, resulting from wear or misalignment of the mounting, additional resolvers are preferably provided so that there is constructed in effect a 3-link vector gage based upon the operating principles described, in which the third link is the section 58 of the tool from the point of attachment 43 down to the center of the cutting surface 41. Additional angle resolvers 56 and 57 for angles $\phi_3$ and $\theta_3$ may be provided and a constant signal may be introduced to represent a fixed length $r_3$ constituting the third link.

Figure 9:
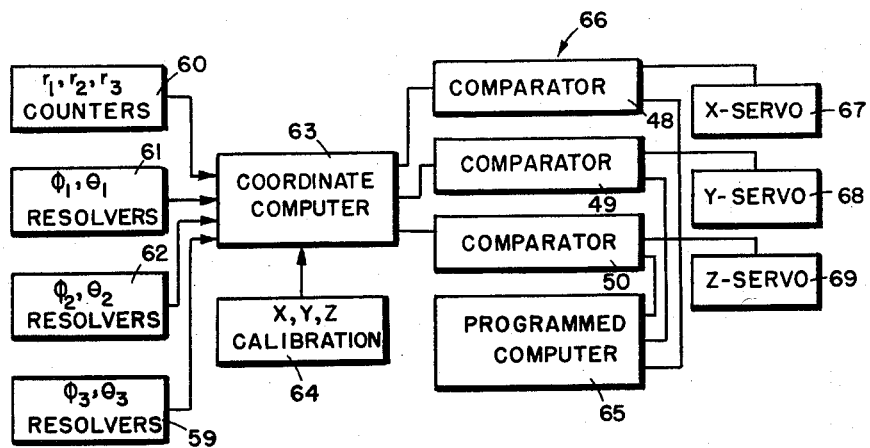
Fig. 9 is a block diagram of an electronic circuit utilized with the machine tool control shown in Fig. 7.

Referring now to Fig. 9, a block diagram of the electronic circuit utilized with the machine tool of Fig. 7 is shown. Counters 60 generate electric signals proportional to the lengths, $r_1$, $r_2$ and $r_3$, of links 44, 55 and 58 of vector gage 40. Resolvers 61 produce electric signals proportional to the angles $\phi_1$ and $\theta_1$ indicative of the instantaneous bearing of lever 55 relative to the X, Y and Z coordinates. Resolvers 62 produce electric signals proportional to angles $\phi_2$ and $\theta_2$ indicative of the instantaneous bearing of lever 44 relative to lever 55. Resolvers 59 produce electric signals proportional to angles $\phi_3$ and $\theta_3$, indicative of the instantaneous bearing of the link 58 relative to the lever 44. These signals are coupled in the coordinate computer 63 which is also subjected to calibration signals from X, Y and Z calibration unit 64 in a manner to generate signal outputs proportional to the X, Y and Z coordinates of cutting edge 41. Programmed computer 65 produces in a programmed manner output signals proportional to the desired X, Y and Z coordinates of cutting edge 41. Comparator assembly 66 including the comparators 48, 49, 50 compares the two input signals and produces signal outputs proportional to the positional error of cutting edge 41. These error signals are coupled to servos 67, 68 and 69 which move the workpiece relative to cutting tool in a manner to reduce the positional errors to zero.

Referring now to Fig. 10, a schematic drawing of a typical coordinate computer for a two-link system is shown. The primary of transformer 70 is subjected to a constant magnitude alternating current from source 71. Potentiometers 72 and 73 are connected across a secondary of transformer 70. Wiper 74 on potentiometer 72 is positioned at a point determined by the length of the first link of the vector gage. Wiper 75 is positioned at a point determined by the length of the second link of the vector gage. The magnitudes of the signals picked off by wipers 74 and 75 are, therefore, proportional to the lengths $r_1$ and $r_2$, respectively. It will be understood that if grid-counting length indicators are utilized for the links 5 and 6, suitable digital-to-analog converting apparatus is employed for actuating the potentiometer wipers 74 and 75.

A typical electromagnetic resolver used to resolve the components of a vector from one set of axes to another set in the same plane is shown in Fig. 11. In Fig. 11 windings 90 and 91 are stator windings, while windings 92 and 93 are rotor windings. The relative angle between the stator and rotor windings is designated by the angle $\alpha$. Under these conditions and assuming coil 91 is subjected to signal $a$, and coil 90 is subject to signal $b$, the output signals $a'$ and $b'$ of the resolver are represented by the following formulae:

$$a' = a \cos \alpha + b \sin \alpha \qquad (28)$$
$$b' = b \cos \alpha - a \sin \alpha \qquad (29)$$

Referring once again to Fig. 10, the potential picked off by wiper 75 is connected to the $b$ stator winding of resolver 76. The rotor of resolver 76 is positioned in response to angle $\phi_2$ of Fig. 1. The $b'$ output signal from resolver 76 is coupled to summing network 78, while the $a'$ output signal is connected to the $a$ winding of resolver 77. Summing network 78 is also subjected to signal from wiper 74 proportional to length $r_1$. The output of summing network 78 is coupled to the $b$ winding of resolver 79. The $a$ winding of resolver 79 is connected to the $a'$ output of resolver 77 whose rotor is positioned in accordance with the angle $\theta_2$. The rotor of resolver 79 is positioned in response to the angle $\phi_1$. The $b'$ output of resolver 79 is a signal proportional to the Z coordinate of the free end of the vector gage, in accordance with the formula 27. If necessary, this output can be compensated for an offset by utilizing summing network 81 which is also subjected to a signal from potentiometer 82 which is proportional to the Z offset.

The $a'$ output of resolver 79 is connected to the $b$ winding of resolver 80. The $a$ winding of resolver 80 is connected to the $b'$ winding of resolver 77. The rotor of resolver 80 is positioned in accordance with the angle $\theta_1$. The $a'$ output of resolver 80 is proportional to the X coordinate of the free end of the vector gage in accordance with Equation 25. This output signal can also be compensated for offset in the X-direction utilizing summing network 83 and potentiometer 84. The $b'$ output resolver 80 is proportional to the Y coordinate of the free end of the vector gage in accordance with Equation 26. This output signal can be compensated for offset in the Y-direction utilizing summing network 85 and potentiometer 86. The wipers of potentiometers 84, 86 and 82 are preset to pick off signals proportional to the offset in the X, Y and Z directions, respectively.

The invention has been described primarily, as to specific detailed elements, as arranged for employing analog type of angle measurement and resolutions. However, the invention is not limited thereto and does not exclude digital angle measurement, such as might be accomplished by a magnetic or photoelectric grid system in which the grid is graduated in trigonometric function of angles instead of linearly as for the link length measurements.

In the foregoing specification vector gages have been described with a pair of links adjustable in length and with fully flexible pivots. It will be understood, however, that the invention is not limited thereto and does not exclude, for example, vector gages constructed with one or both links of fixed lineal length and/or with a lesser number of angular degrees of freedom about pivot points 4 and 7. Such a gage would be considerably limited in its flexibility. The simplicity of design might in some cases and for some uses warrant the limitations on flexibility. Similarly, the flexible linkage system which is utilized to connect the reference point to the point on the workpiece can be constructed of three or more links pivotally connected in series with the free end of one end link pivotally supported at reference point 4 and the free end of the other end link placed against the workpiece at the proper point.

Although the invention has been described and illustrated in detail, it is to be clearly understood that the same is by way of illustration and example only and is not to be taken by way of limitation, the spirit and scope of this invention being limited only by the terms of the appended claims.

I claim:

1. Machining apparatus comprising supporting mechanism for a workholder and a tool, for movably supporting one relative to the other, a plurality of links, one having an end with a connection to the workholder, another having an end with a connection to the tool, said links having pivotal connections, angle sensing means connected to sense the angles between said links and produce angle function signals, a computer for combining said signals to produce an output representing the vector resultant of said links and driving mechanism for relatively moving said supporting mechanism responsive to said computer for producing a predetermined positional relationship between said tool and said workholder.

2. Machining apparatus comprising in combination supporting mechanism for workholder and a tool for supporting one movably relative to the other, a plurality of links one with an end with a pivotal connection to the workholder, another having an end with a pivotal connection to the tool, pivotal connections between said links, angle sensing means at each of said pivotal connections to sense the angle of each link relative to adjacent elements to which it is connected and produce angle function signals, a computer for combining said signals to produce an output representing the vector resultant of said links, programming equipment, and driving mechanism jointly actuated by said computer, and said programming equipment, connected to said supporting mechanism for relatively traversing the tool with respect to the workholder in accordance with a predetermined pattern of said programming equipment.

3. Machining apparatus comprising in combination a workholder, a tool holder, multidirectional carriage means for movably supporting one of said elements, a vector gage having a point fixed in relation to the workholder, a second point fixed in relation to the tool holder, a computer responsive to said vector gage for producing output signals representing coordinates of the tool holder relative to the workholder, a program mechanism, and driving mechanism for said carriage means jointly responsive to said computer and program mechanism for causing relative movement of the tool holder and the workholder according to a predetermined program.

4. In a machine tool having a workholder and a tool holder, a vector gage comprising in combination a plurality of links one of which has an end with a pivotal connection to the tool holder, another having an end with pivotal connection to the workholder, angle sensing means associated with one of said pivotal connections to produce an angle function signal, pivotal connections between said links, angle sensing means connected to sense angle between said links and produce an angle function signal, and a computer for combining such signals to produce an output representing coordinates of said tool holder relative to said workholder.

5. Machining apparatus comprising a tool and a workholder mounted for relative movement, a sectional flexible gage having first and second end portions respectively connected to a first point fixedly related to said tool and a second point fixedly related to said workholder, said gage including means for generating signals in accordance with the positions of said gage sections relative to each other and relative to one of said points, computing means responsive to said signals for producing output signals in accordance with the relative position of said points, and means responsive to said output signals for controlling said relative movement.

6. In combination with a pair of relatively movable elements, a vector gage comprising a plurality of pivotally interconnected links, angle sensing means connected to sense the angle between said links and produce angle function signals, and computer means for combining said signals to produce an output representing the vector resultant of said links, said gage having a portion fixedly related to one of said elements and a portion fixedly related to the other of said elements.

7. Machining apparatus comprising a relatively movable toolholder and workholder, a vector gage comprising a plurality of pivotally interconnected links, angle sensing means connected to sense the angle between said links and produce angle function signals, and computer means for combining said signals to produce an output representing the vector resultant of said links, said gage having a portion fixedly related to said workholder and a portion fixedly related to said toolholder.

8. The structure of claim 7 including driving means responsive to said computer for effecting motion of one of said toolholder and workholder relative to the other.

9. The structure of claim 8 wherein said driving means includes a program mechanism, and means jointly responsive to said computer and program mechanism for effecting said relative motion.

10. A multi-dimensional machine tool comprising a toolholder element and a workholder element mounted for relative motion in each of a plurality of dimensions, a flexible vector gage having portions thereof fixedly related to respective ones of said elements, said gage including an articulated linkage and means for sensing angles of said linkage, computer means responsive to said sensing means for computing and generating signals representing the positional relation between said elements, a program mechanism, driving means for moving one of said elements relative to the other in each of said dimensions, and means responsive to said program mechanism and said computer means for controlling said driving means.

References Cited in the file of this patent

UNITED STATES PATENTS

| | | |
|---|---|---|
| 2,535,942 | Lewis et al | Dec. 26, 1950 |
| 2,563,599 | Gardner | Aug. 7, 1951 |
| 2,628,539 | Neergaard | Feb. 17, 1953 |
| 2,704,012 | Trinkle | Mar. 15, 1955 |
| 2,716,340 | Nance | Aug. 30, 1955 |
| 2,804,264 | Stern | Aug. 27, 1957 |

FOREIGN PATENTS

| | | |
|---|---|---|
| 1,114,501 | France | Dec. 19, 1955 |